May 25, 1943.  A. E. PAPP  2,320,155
ELECTRICAL CONNECTION
Filed Nov. 1, 1940
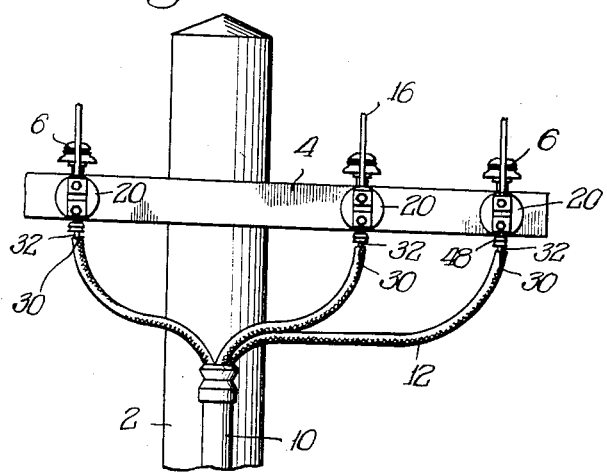
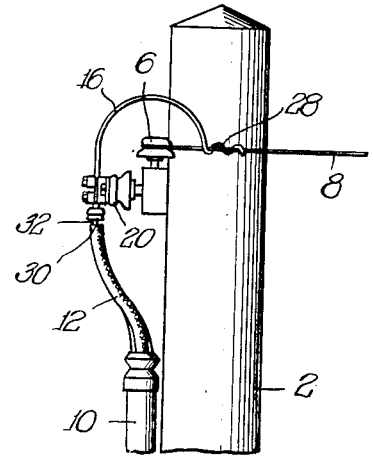
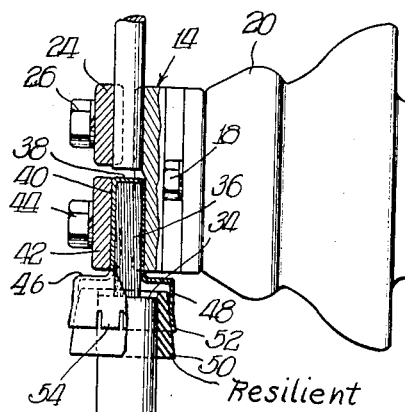
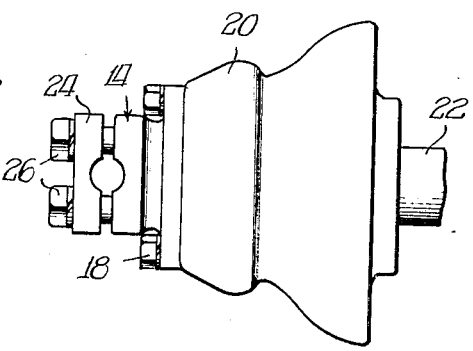
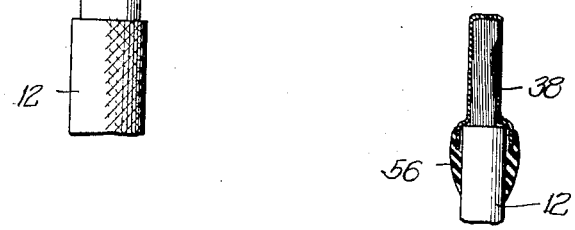
INVENTOR.
Andrew E. Papp,
BY Wilkinson Huxley, Byron Knight
Attys.

Patented May 25, 1943

2,320,155

UNITED STATES PATENT OFFICE 2,320,155

ELECTRICAL CONNECTION

Andrew E. Papp, Chicago, Ill., assignor to G & W Electric Specialty Co., Chicago, Ill., a corporation of Illinois Application November 1, 1940, Serial No. 363,801

3 Claims. (Cl. 173—269)

The present invention relates to electrical devices, and more in particular to terminal connections for cables and the like.

Among the objects of the present invention is to provide a novel electrical connection for a cable which embodies means for effectively sealing the end of said cable to prevent the entrance of moisture and other foreign substances into the joint formed between the conductor therefor and its protective covering.

More particularly, the present invention has as an object to provide a novel protective housing for the end of a cable to protect the joint between the conductor therefor and its protective covering and which is highly effective in establishing an electrical connection between the said cable conductor and another electrical conductor irrespective of the location of the connection to be made.

A further object of the present invention is to provide a novel cable terminal connection embodying a protective element or housing for the cable conductor and its protective covering to seal the joint between the said conductor and covering and through which an electrical connection can be readily and easily perfected with an electrical conducting device.

While varied applications of the present invention in the art are recognized, nevertheless said invention contemplates as one of its more desirable characteristics such novel connections as hereinbefore enumerated wherein the said cable is disposed in substantially vertical position to seal the exposed joint between the conductor and its covering and to protect said covering against damage, thereby preventing deterioration of said covering and to provide and maintain over extended periods of time an effective and efficient connection for the transmission of electrical energy.

Other objects, features, capabilities and advantages are comprehended by the invention, as will later appear and as are inherently possessed thereby.

Referring to the drawing:

Figure 1 is a fragmentary view in elevation of a pole and its cross-arm, disclosing connections for cables made in accordance with the present invention;

Figure 2 is a fragmentary view in side elevation of the assembly shown in Figure 1 of the drawing;

Figure 3 is an enlarged fragmentary view in side elevation of a part of the assembly shown in Figures 1 and 2 of the drawing;

Figure 4 is an enlarged top plan view of the structure shown in Figure 3 of the drawing; and Figure 5 is a detached fragmentary view of a cable end embodying a novel terminal connection therefor, but varying somewhat from the connection shown in Figure 3 of the drawing.

Referring now more in detail to the drawing, an embodiment of the invention is shown in an assembly at the top of a pole 2 having a cross-arm 4 provided with a plurality of insulators, such as 6, to each of which is connected a line 8 for transmitting electricity, the said lines 8 extending between and being connected to spaced poles, such as 2, in the manner disclosed.

The present invention is directed more particularly to a novel connection between the transmission lines 8 and the vertically disposed cable 10 which may be secured to the pole 2 in any desired manner for the purpose of taking off electrical energy from said transmission lines 8 for house circuits and the like, or for transmitting electrical energy to said lines 8. The cable 10 is shown as including three cable conductors, such as 12, to be connected to the three lines as shown in the drawing, but it is to be understood that said assembly may include any number of conductors, if desired. Since all of the connections in the present assembly are alike, reference will be made to one only for the purpose of fully describing the invention.

The said cable 12 is connected to a line 8 through a clamping mechanism, generally referred to as 14, and through the medium of an aerial cable 16 connected at one end to the clamping mechanism 14 and at its other end to the line 8. Clamping mechanism 14 is secured by means of bolts 18 to the outer end of an insulator 20 which may be of porcelain, glass, or any other insulating material, which in turn is mounted through the medium of a metal post 22 to the cross-arm 4 at the top of the pole 2. The upper part of the clamping device includes an adjustable clamping element 24 secured in position by the bolts 26 to clamp the end of the aerial cable 16 in electrical conducting relation to the clamping device, the said aerial cable having its other end twisted about the transmission line 8 as shown at 28, which may, if desired, be taped or otherwise secured in position.

The cable 12 adjacent the clamping mechanism 14, as at 30, has its outer jacket removed to expose the insulation 32, which may be of rubber, rubber-like material, or the like, and which terminates as at 34 to lay bare the terminal end of the conductor 36, all as shown in the drawing, and which comprises a plurality of strands of copper or other electrical conducting material. In order to provide a weather-tight housing for the terminal end of the conductor 36 at the joint between the insulation 32 and the metal strands, a housing or hood 38 is provided which has a centrally disposed tubular part 40 embracing the conductor 36 formed with a closed end and flexible wall. The hooded end of conductor 36 is gripped by the clamping mechanism 14 and held in place by the clamping element 42 when the bolts 44 are tightened whereby to effect an efficient electrical connection to transfer electrical energy from the transmission line 8 through the aerial cable, thence through the clamping mechanism 14 to the conductor 36, or vice versa.

Since the assembly disclosed herein involves a substantially vertical disposition of the cable 12, it is highly important to provide means to prevent rain, snow, or other foreign material from entering the joint between the conductor 36 and the insulation 32. The hood 38 provides an efficient medium, not only for the purpose of providing an effective electrical connection between the conductor 36 and the clamping mechanism 14, but also to provide for a weather-tight joint at the terminal end of said cable. To accomplish the latter result, the said hood 38 is further provided with an enlarged skirt including the radially extending flange 46 which merges into the depending axially disposed wall 48 which overlaps the end of the insulation 32 and which, in itself, rather effectively prevents the entrance of moisture and foreign substances into the joint between the insulation and conductor.

However, as shown in Figure 3 of the drawing, this joint is further sealed through the medium of a collar or ferrule 50 which may be of rubber, either natural or synthetic, or other non-conducting material which may be compressible to closely embrace the insulation 32, and which ferrule is in the form of a wedge having wedging relation with the lower part 52 of the axially disposed wall 48 whereby a complete seal is effected preventing entrance of moisture or other foreign substances into the joint between the conductor 36 and its insulated covering 32 and preventing fraying or other damage to the end of insulation 32. The assembly of the said ferrule or collar and the hood 38 is more effectively held in normal operative position by one or more spring clips or fingers 54 struck from the end part 52 which resiliently grip the ferrule or collar 50.

While the connection shown in Figure 3 of the drawing is highly efficient in providing a proper joint between a vertically disposed cable and a securing means, such as the clamping mechanism 14, nevertheless other embodiments are contemplated, one being shown in Figure 5 as an alternative construction wherein the joint between the cable 12 and the hood 38 is wrapped by tape 56 which overlaps the lower skirt of the hood 38 to completely seal the space between the same and the insulation 32. This form of the invention is equally as effective as those hereinbefore described as a means of maintaining the electrical efficiency of the assembly as herein disclosed, and while both modifications are easily and readily assembled in respect to the cable and the clamping mechanism, the preferred construction embodies the resilient ferrule or collar as shown in Figure 3, although the taped joint may be used in situations where the ferrule is not available.

The novel constructions above described can be readily and easily effected in the field under all conditions whereby the electrical efficiency of the assembly involving a connection between a power line and cable is maintained under all conditions. Disassembly of the elements of the connections shown and disclosed is likewise readily effected where the same becomes necessary to repair or replace any of the parts or elements thereof.

While I have herein described and upon the drawing shown an illustrative embodiment of the invention, it is to be understood that the invention is not limited thereto but may comprehend other constructions, arrangements of parts, details and features without departing from the spirit of the invention.

I claim:

1. An electrical terminal, comprising a cable having a conductor laid bare at one of its ends, a protective hood fitting over and completely enclosing said conductor and having a yieldable wall to provide for an electrical connection therethrough, said cable being secured to said protective hood by means external thereto, a collar of resilient material embracing said cable adjacent said conductor, and said hood having a skirt overlapping the cable covering and embracing said collar.

2. An electrical terminal, comprising a cable having a conductor laid bare at one of its ends, a protective hood fitting over and completely enclosing said conductor and having a yieldable wall to provide for an electrical connection therethrough, said cable being secured to said protective hood by means external thereto, a wedge collar of resilient material embracing said cable adjacent said conductor, and said hood having a skirt overlapping the cable covering and having wedging relation with said collar.

3. An electrical terminal, comprising a cable having a conductor laid bare at one of its ends, a protective hood fitting over and completely enclosing said conductor and having a yieldable wall to provide for an electrical connection therethrough, said cable being secured to said protective hood by means external thereto, a wedge collar of resilient material embracing said cable adjacent said conductor, and said hood having a skirt overlapping the cable covering and having wedging relation with said collar, said skirt being formed with one or more flexible collar gripping fingers.

ANDREW E. PAPP.